A. ROMMELAERE.
BESSEMER CONVERTER.
APPLICATION FILED APR. 2, 1918.

1,299,034.

Patented Apr. 1, 1919.
2 SHEETS—SHEET 1.

WITNESSES

Albert Rommelaere, INVENTOR

BY
ATTORNEYS

A. ROMMELAERE.
BESSEMER CONVERTER.
APPLICATION FILED APR. 2, 1918.

1,299,034.

Patented Apr. 1, 1919.
2 SHEETS—SHEET 2.

WITNESSES
H. E. Barry

Albert Rommelaere, INVENTOR

BY
ATTORNEYS

UNITED STATES PATENT OFFICE.

ALBERT ROMMELAERE, OF SOUTH VANCOUVER, BRITISH COLUMBIA, CANADA.

BESSEMER CONVERTER.

1,299,034.   Specification of Letters Patent.   Patented Apr. 1, 1919.

Application filed April 2, 1918. Serial No. 226,198.

*To all whom it may concern:*

Be it known that I, ALBERT ROMMELAERE, a subject of the King of England, and residing at South Vancouver, British Columbia, Canada, have invented certain new and useful Improvements in Bessemer Converters, of which the following is a specification.

My invention relates to improvements in Bessemer converters, more especially those of the side blown type, in which one or more twyers are used, and it consists in the combinations, constructions and arrangements herein described and claimed.

An object of my invention is to provide a converter of this type with an improved wind box having a knock-out back. I accomplish this by cutting away the shell of the converter the full length of the wind box, thus providing a space whereby the refractory lining may be easily removed or replaced.

A further object of my invention is to provide a wind box having a plurality of twyers leading therefrom, these twyers being arranged at different angles with respect to one another so as to produce a rotary movement of the contents of the converter, by means of which different portions of the molten bath are brought successively under the oxidizing action of the air blast, thereby providing a uniform distribution of the air and preventing over oxidation at any one portion of the molten contents of the converter.

A further object of my invention is to provide a wind box having openings or peep holes so arranged that the contents of the converter may be viewed through the twyers, without necessitating the suspension of the blowing operation or the tilting of the converter and the removal of the cover as in the ordinary device.

A further object of my invention is to provide means for the removal of any obstructions in the twyers themselves. This is accomplished by means of doors in the wind box cover through which a rod may be thrust to clear the obstruction in the twyers, these doors opening inwardly so that the internal pressure normally tends to keep the doors tightly closed, thus preventing leakage.

Other objects and advantages will appear in the following specification and the novel features of the invention particularly pointed out in the appended claims.

My invention is illustrated in the accompanying drawings forming part of this application, in which.

Figure 1:
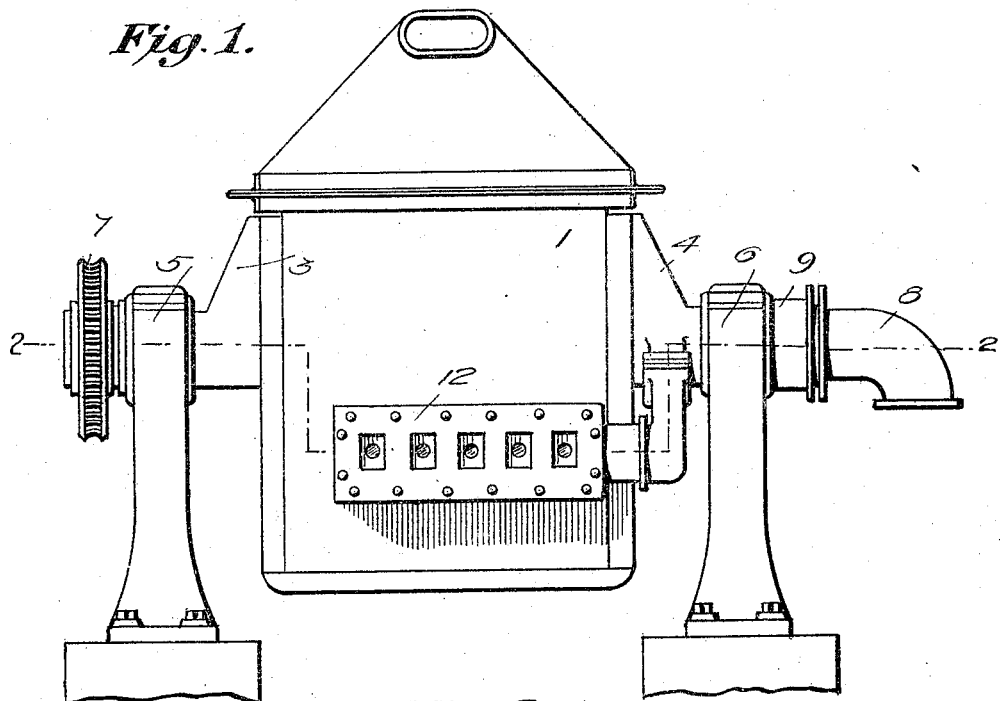
Figure 1 is a side elevation of the device.

In carrying out my invention, I provide a receptacle having an outer metal casing 1 and an inner refractory lining 2, of the shape shown in the drawing. The casing is mounted on hollow trunnions 3 and 4 which are rotatably supported in bearings 5 and 6 respectively, the trunnion 3 having an extension $3^x$ upon which is mounted a driving gear 7. The trunnion 4 communicates with an air intake pipe 8, being connected therewith by means of a stuffing box 9 so that air may be admitted in any position of the converter.

Figure 2:
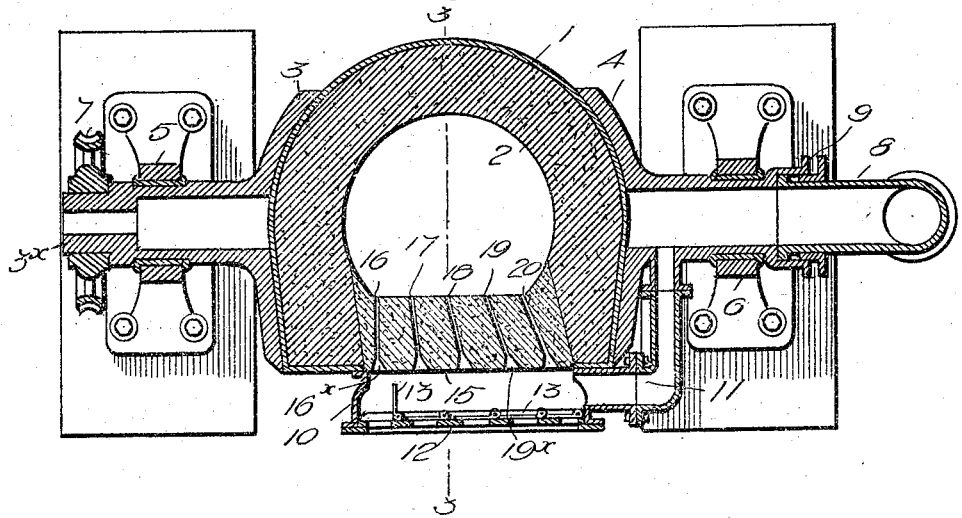
Fig. 2 is a section on the line 2—2 of Fig. 1.
Figure 3:
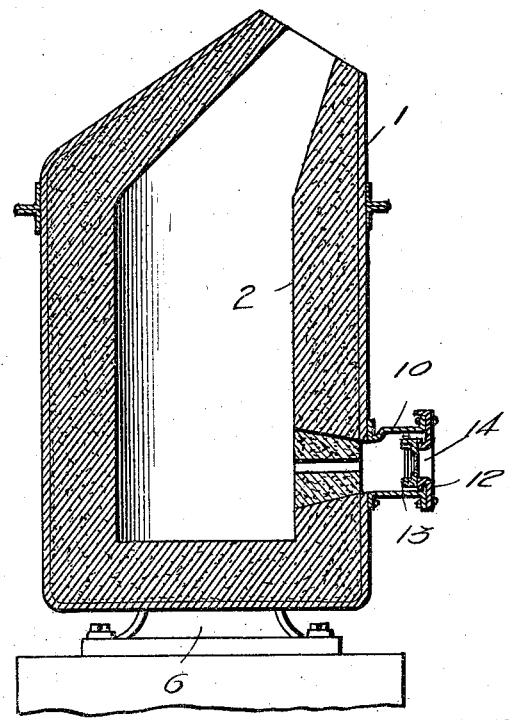
Fig. 3 is a section along the line 3—3 of Fig. 2.
Figure 4:
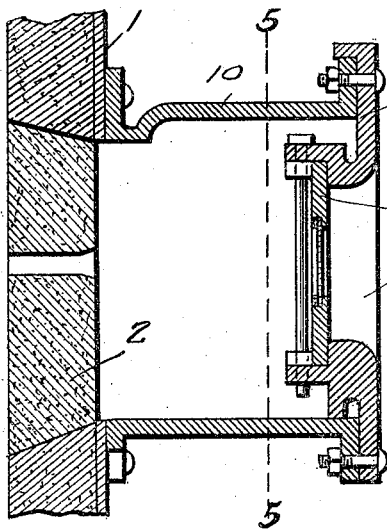
Fig. 4 is an enlarged section through the wind box.
Figure 5:
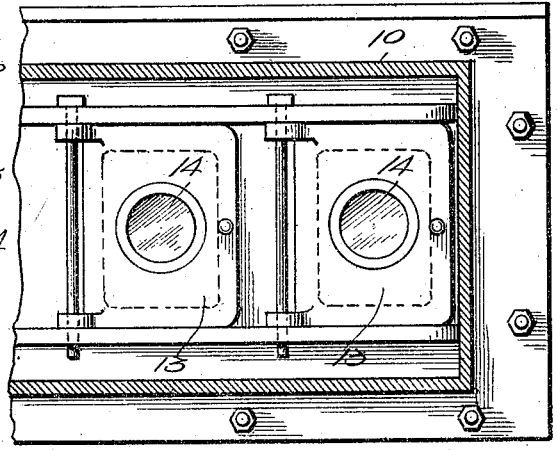
Fig. 5 is a section along the line 5—5 of Fig. 4.

As will be seen from Fig. 2, the metal casing 1 is cut away on one side of the converter and covering this cut-away portion is a wind box 10 which communicates with the hollow trunnion 4 by means of a pipe 11. The wind box 10 is provided with a front plate 12 which is bolted or otherwise secured to the main body portion of the box as shown in Fig. 4 and the plate 12 has a series of openings, preferably rectangular, which are normally closed by hinged doors 13 that open inwardly. Each door is provided with an opening closed by a refractory transparent sheet or pane 14. These sheets may be made of mica or any other suitable material.

The twyers are formed in a knock-out section 15 immediately adjacent to the wind box. This knock-out section is made of refactory material similar to that which forms the lining of the converter. It will be observed that the twyers are angularly disposed with respect to one another. The one at the extreme left in Fig. 2 is substantially at right angles to the front of the wind box as shown at 16. The adjacent twyer 17 is inclined toward the twyer 16, while the next twyer 18 is still more inclined, the twyers 19 and 20 having greater inclination from the front of the wind box. The front portions of each of these twyers, it will be observed, is enlarged as shown at 16×, 19×, etc. The twyers are so arranged that each may be reached by opening the door 13 of the wind box in alinement with the twyer.

From the foregoing description of the various parts of the device, the operation thereof may be readily understood. The converter is charged in the usual manner and air is admitted through the air intake pipe 8 through the passage 11 into the wind box, from whence it is forced through the twyers into the interior of the receptacle. The progress of the operation may be viewed through the peep holes without interrupting the air blast and without the necessity of tilting the converter or opening the top thereof. If for any reason the twyers should become clogged, they can be opened by thrusting a rod or other suitable instrument through the open door 13 in front of the particular twyer to be opened up, and the obstruction may be removed. When the blast is being operated, the doors 13 of course are shut and leakage is prevented because of the fact that the doors open inwardly and not outwardly.

The streams of air coming in at various angles tend to give the contents of the receptacle a rotating or gyratory movement so that different portions of the molten bath are brought successively under the action of the air coming through the twyers. This results in a more homogeneous product and obviates the danger of over oxidizing one portion of the bath.

The greatest wear in a Bessemer converter occurs near the twyers. This is due to the fact that the lining which is of an acid material is fluxed by the iron oxid that is formed when the blast strikes the bath. This portion of the converter is easily repaired by knocking out the lining. In order to do this, it is only necessary to remove the cover portion 12 of the wind box. This at once gives access to the knockout lining and the latter may be easily removed and replaced, or the converter may be entered for the purpose of further repairs.

Another feature to which I desire to call attention is the fact that the churning movement caused by the streams of air directed mainly toward one side of the bath, causes a better separation of the gases and slag as soon as they are formed in the metal.

I claim:—

1. A Bessemer converter comprising a casing, a refractory lining within the casing, said casing having a cut-away portion, a knockout section of the refractory lining disposed adjacent to said cut-away portion, a plurality of twyers carried by said knock-out section, and a wind box arranged to communicate with said twyers and having a detachable front for permitting access to the knock-out section.

2. A Bessemer converter comprising a metal casing having a cut-away portion, a refractory lining within the casing, a knock-out section constituting a continuation of said refractory lining and disposed in registration with said cut-away portion of the casing, said knock-out portion carrying a plurality of twyers, and a wind box covering the said cut-away portion and having a detachable front for permitting access to the knock-out portion.

3. A Bessemer converter comprising a metal casing having a cut-away portion, a refractory lining within the casing, a knock-out section constituting a continuation of said refractory lining and disposed in registration with said cut-away portion of the casing, said knock-out portion carrying a plurality of twyers, a wind box covering the said cut-away portion and having a detachable front for permitting access to the knock-out portion, doors carried by the detachable front, and peep holes in said doors.

4. A Bessemer converter comprising a metal casing having a cut-away portion, a refractory lining within the casing, a knock-out section constituting a continuation of said refractory lining and disposed in registration with said cut-away portion of the casing, said knock-out portion carrying a plurality of twyers, a wind box covering said cut-away portion and having a detachable front for permitting access to the knock-out portion, doors carried by the detachable front and arranged to swing inwardly into the wind box, and peep holes carried by the doors in alinement with the individual twyers.

ALBERT ROMMELAERE.

Copies of this patent may be obtained for five cents each, by addressing the "Commissioner of Patents, Washington, D. C."